US006862547B2

(12) United States Patent
Snowbarger et al.

(10) Patent No.: US 6,862,547 B2
(45) Date of Patent: Mar. 1, 2005

(54) CONTROL DEVICE TEST SYSTEM WITH A REMOTE SWITCH ACTIVATION

(75) Inventors: Jimmie L. Snowbarger, Marshalltown, IA (US); Riyaz M. Ali, Marshalltown, IA (US); Patrick S. Flanders, Dhahran (SA)

(73) Assignees: Saudi Arabian Oil Company, Dhahran (SA); Fisher Controls International, Inc., St. Louis, MO (US)

( * ) Notice: Subject to any disclaimer, the term of this patent is extended or adjusted under 35 U.S.C. 154(b) by 0 days.

(21) Appl. No.: 10/116,940

(22) Filed: Apr. 5, 2002

(65) Prior Publication Data

US 2003/0062494 A1 Apr. 3, 2003

Related U.S. Application Data

(60) Provisional application No. 60/281,852, filed on Apr. 5, 2001.

(51) Int. Cl.[7] .................. G01L 25/00; G01M 10/00; G01M 15/00; G01M 17/00; G01M 7/00
(52) U.S. Cl. ............... 702/114; 702/118; 702/184; 73/1.72; 73/168; 137/14; 438/258; 438/259
(58) Field of Search ................ 702/114, 118, 702/184; 73/168, 1.72; 137/14; 438/258–259

(56) References Cited

U.S. PATENT DOCUMENTS

| | | | | |
|---|---|---|---|---|
| 3,829,842 A | | 8/1974 | Langdon et al. | |
| 4,428,223 A | * | 1/1984 | Trevisan | 73/1.72 |
| 4,557,136 A | * | 12/1985 | Greenhalf | 73/1.72 |
| 5,000,040 A | * | 3/1991 | Charbonneau et al. | 73/168 |
| 5,109,692 A | | 5/1992 | Fitzgerald | |
| 5,425,270 A | * | 6/1995 | McDonald et al. | 73/168 |
| 5,469,737 A | * | 11/1995 | Smith et al. | 73/168 |
| 5,568,376 A | | 10/1996 | Benmergui et al. | |
| 5,870,317 A | | 2/1999 | Barnett et al. | |
| 5,970,430 A | | 10/1999 | Burns et al. | |
| 6,119,047 A | | 9/2000 | Eryurek et al. | |
| 6,176,247 B1 | * | 1/2001 | Winchcomb et al. | 137/14 |
| 6,186,167 B1 | | 2/2001 | Grumstrup et al. | |

FOREIGN PATENT DOCUMENTS

WO    WO 00/52374 A1    9/2000

OTHER PUBLICATIONS

International Search Report for Application No. PCT/US02/10758, dated Jul. 16, 2002.

* cited by examiner

*Primary Examiner*—Aditya S. Bhat
(74) *Attorney, Agent, or Firm*—Abelman, Frayne & Schwab

(57) ABSTRACT

A control device test system including an electrical switch and a device controller, wherein the device controller has a processor, a memory coupled to the processor, and an auxiliary input coupled to the processor and adapted to receive a binary signal from the electrical switch. A routine is stored in the memory of the processor and is adapted to be executed on the processor to cause a control device test to be performed in response to the receipt of the binary signal at the input.

28 Claims, 3 Drawing Sheets

CONTROL DEVICE TEST SYSTEM WITH A REMOTE SWITCH ACTIVATION

CROSS-REFERENCE TO RELATED APPLICATIONS

This application claims priority to U.S. Provisional Application Ser. No. 60/281,852, entitled "System For Checking Status Of Emergency Shutdown Valve," filed Apr. 5, 2001, the disclosure of which is hereby expressly incorporated herein by reference.

TECHNICAL FIELD

This patent relates to emergency shutdown systems used in process control environments and to the testing of emergency shutdown valves used in such systems.

BACKGROUND

Safety instrument systems incorporate emergency shutdown valves which are normally in a fully opened or fully closed state and controlled by a logic solver or a Programmable Logic Controller (PLC) in an emergency situation. In order to ensure that these valves can properly function, they can be periodically tested by partially opening or closing them. Since these tests are typically performed while the process is on line, it is important to perform any test reliably and then return the valve to its normal state. In this context, the term "normal state" shall refer to theposition or state of the emergency shutdown valve when it is not in an emergency position and the emergency shutdown valve is not under test.

A disadvantage of the prior art systems is that the emergency shutdown tests are typically performed at predetermined intervals. For example, the emergency shutdown tests may be performed only a few times each year, due to cumbersome test procedures and issues related to manpower. Also, during emergency shutdown tests, the emergency shutdown valve, or other emergency shutdown device being tested is not available for use if an actual emergency event were to arise. Limited, periodic testing is not an efficient way of verifying the operablility of the emergency shutdown test system. It would thus be advantageous to develop a system where safety personnel can witness and verify the performance of an emergency shutdown valve and its controlling components by initiating a test while present.

It is also important that any emergency shutdown system provide the ability to activate an emergency shutdown device (a valve, for example) to its safe condition when commanded by the emergency shutdown controller, in the unlikely, but possible situation where an emergency event has occurred during an emergency shutdown device test interval, where the interval is during a shutdown test. In this context, the term "safe condition" refers to an open or closed position if the emergency shutdown device is an emergency shutdown valve, and the "safe" condition is typically, but not always, the position the valve would end up if all power is removed from the electronic components controlling the emergency shutdown valve. In such a situation, it should be possible for the emergency shutdown system to properly command the emergency shutdown device.

Conventional emergency shutdown tests are initiated by using mechanical jammers, collars, pneumatic test cabinets, personal computers, etc. These sophisticated and costly devices function by sending control signals to connected emergency shutdown devices, or to a device such as a digital valve controller that commands an emergency shutdown device. Some conventional devices are hardware and software in bulky equipment that must be carried around by technicians to the test site. Furthermore, the devices typically perform the same test on each emergency shutdown valve. It would thus be advantageous to eliminate the need for these complicated and expensive devices. None of the previous emergency shutdown systems are able to fulfill these requirements.

SUMMARY

A control device test system having a device controller is provided. The device controller includes a processor, a memory that is coupled to the processor, and an auxiliary input coupled to the processor and adapted to receive a binary signal. A routine is stored in the memory of the processor and is adapted to be executed on the processor to cause a control device test to be performed in response to the receipt of the binary signal at the auxiliary input. The control device test system further includes an electrical switch that is coupled to the auxiliary input so as to be operably connected to the processor, wherein the electrical switch generates the binary signal to initiate the control device test.

The electrical switch may be located remote from the device controller, such as near a control device, and may comprise a push button switch. The control device test system may further include an environmentally safe housing that encloses the device controller.

The control device may be an emergency shutdown valve, and the control device test may include a partial stroke test of that emergency shutdown valve. Additionally, the auxiliary input into the control device test system may be a pair of auxiliary contacts. When a voltage is present at a first auxiliary contact, an operator may activate an electrical switch and electrically connect the first auxiliary contact to a second auxiliary contact. Alternatively, the input may be a single auxiliary contact, so that the electrical switch electrically connects a voltage source to the auxiliary input.

The processor may be further configured so that an emergency shutdown test is only activated when the binary signal meets a predetermined timing requirement, such as having a predetermined time duration. The timing requirement for initiation of the emergency shutdown test may require the binary signal to have a time duration greater than a first threshold and less than a second threshold. The routine in the control device test system may be further adapted to cause the emergency shutdown test to abort when a second binary signal, having a predetermined time duration, is received at the input.

DETAILED DESCRIPTION

In a multitude of industries, valves and other mechanical devices are used in process control systems to bring a variety of processes quickly into a safe state if an emergency situation arises. It is thus critically important to test these valves and electro/mechanical devices to ensure that they will function properly in the event of an emergency. For example, to verify a valve's performance, mechanical movement of the valve needs to be verified in a reliable and secure way while a process is running.

Figure 1:
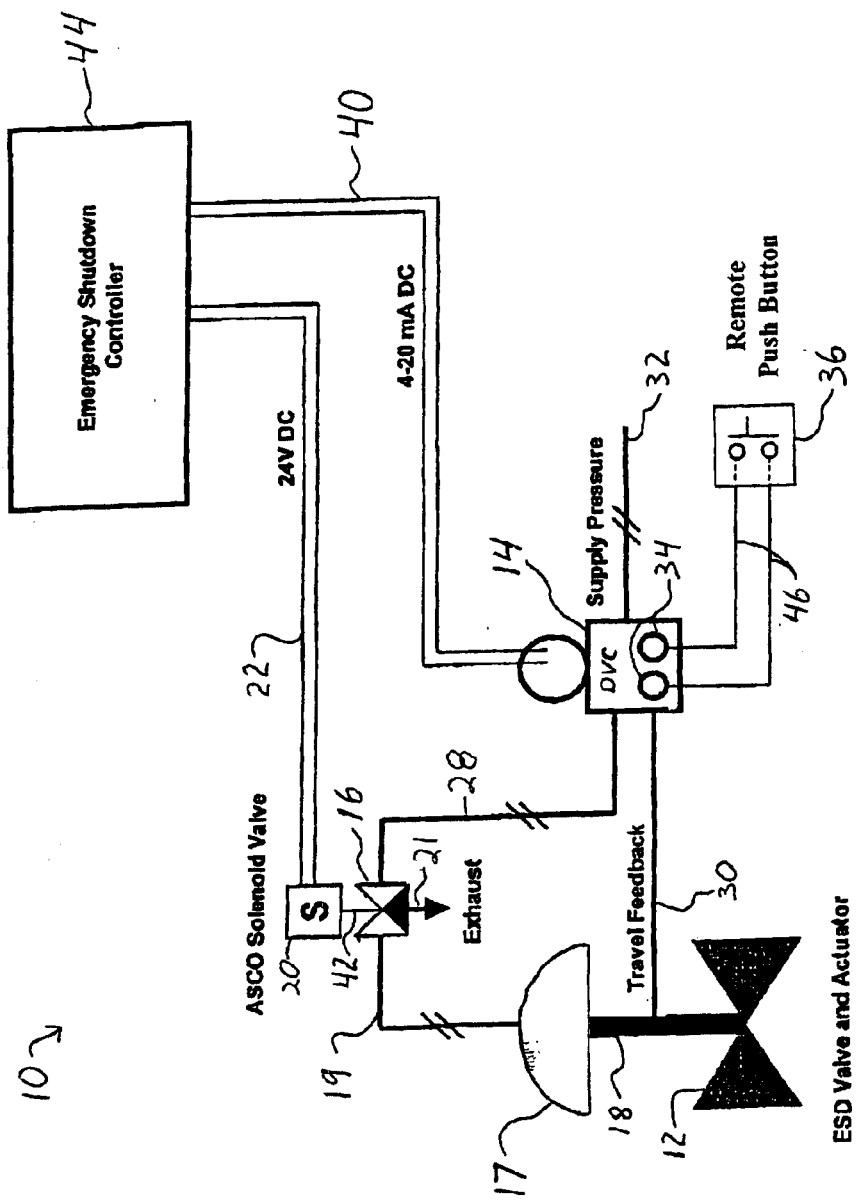
FIG. 1 is a block diagram of several components of an emergency shutdown test system.

FIG. 1 illustrates an example of an emergency shutdown test system 10 for testing an emergency shutdown (ESD) valve 12. It should be appreciated by those skilled in the art that while an emergency shutdown valve is shown in this embodiment, any other control device may be substituted in a control device test system. The emergency shutdown valve 12 may be located, for example, in a process control system including a pipeline supplying fluid at the inlet to the emergency shutdown valve 12 and an outlet pipeline leading fluid from the outlet of the emergency shutdown valve 12.

The emergency shutdown valve 12 is normally in one of two positions, either a wide open state permitting fluid to flow freely between the inlet pipeline and the outlet pipeline, or the emergency shutdown valve 12 is in a fully closed position preventing any fluid flow between the inlet pipeline and the outlet pipeline. In order to ensure that the emergency shutdown valve 12 will properly function in a true emergency shutdown condition, the emergency shutdown valve 12 may be periodically tested by partially opening or closing it. The emergency shutdown test system 10 may include a Digital Valve Controller (DVC) 14 which may control a test operation of the emergency shutdown valve 12. During an emergency shutdown test, the valve 12 can be partially moved, and then returned to its normal state. The emergency shutdown test system 10 may include a solenoid valve 16 to supply pressure to move the emergency shutdown valve 12 to both an emergency position in the event an actual emergency exists, and to a partial stroke position (a predetermined position) during an emergency shutdown test.

Still referring to FIG. 1, a valve actuator 17 may include a pneumatic input coupled to a pneumatic line 19 to move the emergency shutdown valve's plug in response to a change in the pneumatic pressure in the pneumatic line 19. The solenoid valve 16 may include a solenoid control 20 which may receive dc power and electrical control signals on a two wire line 22. For example, the solenoid control 20 may receive 24 volts of direct current over the line 22. The solenoid control 20 may provide an output on an output line 42 that is connected to the solenoid valve 16 to control the flow of pneumatic pressure at the output of the solenoid valve 16. The solenoid valve 16 and the solenoid control 20 may be used to provide a level of redundancy for the emergency shutdown test system 10. The redundancy is achieved by allowing the solenoid valve 16 to open and exhaust the air pressure in the pneumatic line 19 out an exhaust line 21, thus causing the actuator 17 to move the valve stem 18. In other words, a second route in the form of the exhaust line 21 is provided for reducing the air pressure in the pneumatic line 19.

The DVC 14 may be operatively connected to the emergency shutdown valve 12 and may include a pneumatic output line 28 coupled to the solenoid valve 16. The DVC 14 may be powered by a pair of electrical lines 40 and communicate using an open communication protocol, such as over a HART network (a communication protocol well known to those skilled in the art), or any other acceptable network.

In FIG. 1, the pair of electrical lines 40 connect the DVC 14 to an emergency shutdown controller 44. A current signal on the communication line 40 identifying a digital setpoint sent from a device using the HART protocol, or any other preconfigured default setpoint, may be used by the DVC 14 as a target plug position. The DVC 14 may cause air pressure to move the valve actuator 17.

The DVC 14 may include an auxiliary input in the form of a separate set of auxiliary contacts 34. The auxiliary contacts 34 are connected to an external remote activation apparatus, such as, for example, a push button 36, via lines 46. In embodiments where the auxiliary input includes the set of contacts 34, a voltage may be present at a first auxiliary contact, and the push button 36 may electrically connect the first auxiliary contact to a second auxiliary contact. Those skilled in the art will appreciate that a single contact may alternatively be used in place of the set of auxiliary contacts 34, wherein the push button 36 may electrically connect a voltage to the single auxiliary contact. The push button 36 may be an inexpensive electrical switch for initiating a partial stroke test of the emergency shutdown valve 12. Furthermore, the push button 36 may be located remote from the DVC 14 in a location that provides convenient access to the push button 36.

Figure 2:
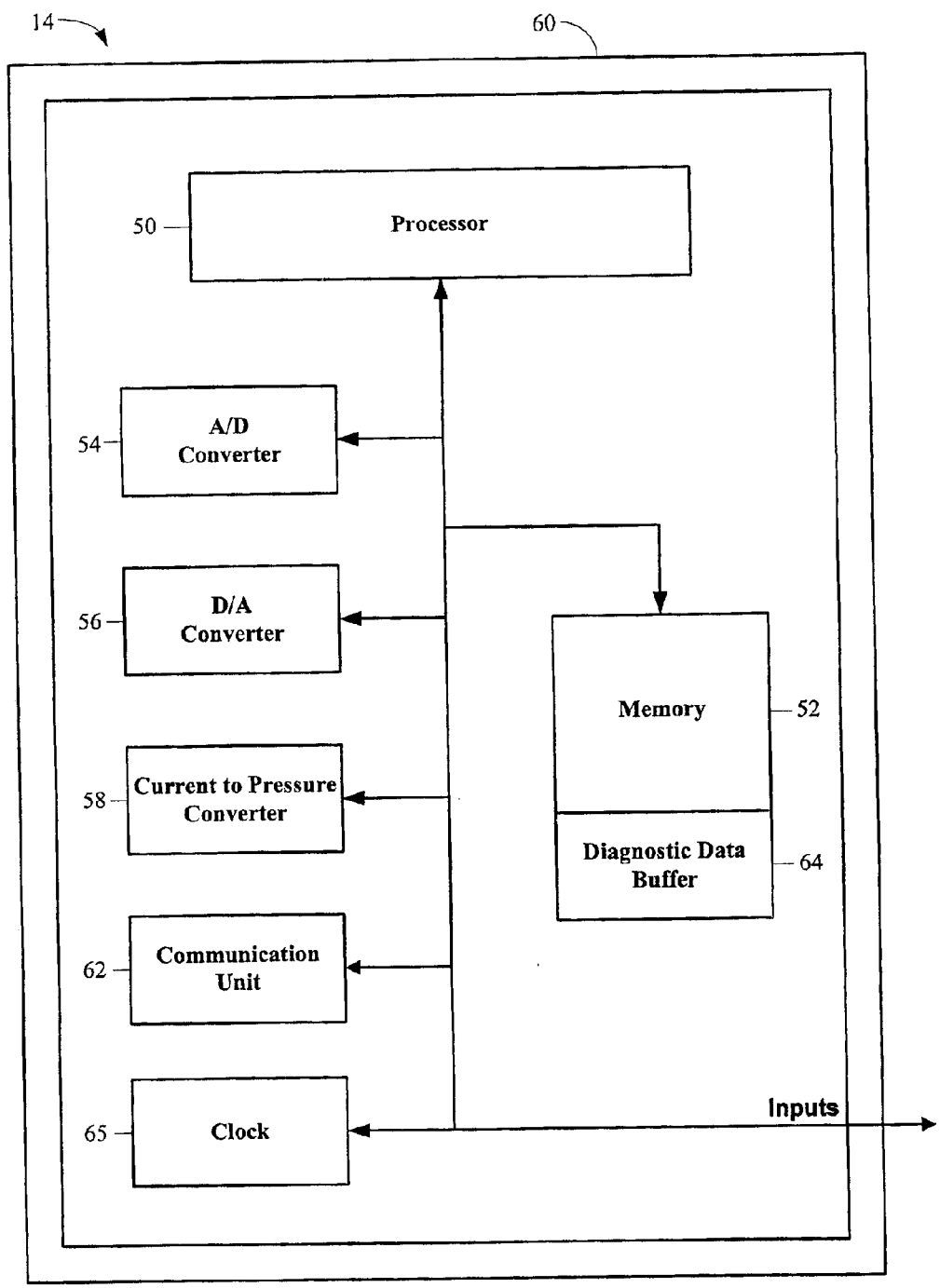
FIG. 2 is a block diagram of several components of a digital valve controller.

In general, the DVC 14 is a processor based emergency shutdown valve controller. The embodiment of FIG. 2 includes some of the same structures and components as previously shown in FIG. 1. For clarity, the structures and components remaining the same are shown with like reference numbers as those in FIG. 1. As illustrated in FIG. 2, the DVC 14 includes a processor 50, sensors (not shown), a memory 52, an analog-to-digital (A/D) converter 54, a digital to analog (D/A) converter 56, and a current to pressure converter 58. The memory 52 is utilized to store a variety of information. The A/D converter 54 converts the inputs from one or more sensors from analog to digital format and transfers the corresponding digital signals to the processor 50. The DVC 14 may also detect the closure of the electrical switch 36. The D/A converter 56 may convert a plurality of outputs for the DVC 14 which include driving the current to pressure converter 58, which may create the pressure to drive the emergency shutdown valve actuator 17.

The DVC 14 may be enclosed within a housing, such as an explosion proof terminal cover 60 of FIG. 2. The terminal cover 60 may be used to prevent sparks from electrical equipment enclosed within the terminal cover 60 from reaching a harsh and dangerous operating environment external of the terminal cover 60, and thus reduce the likelihood of causing an explosion. Locating the push button 36 outside the terminal cover 60 allows activation of an emergency shutdown test on an emergency shutdown device without opening the terminal cover 60. In hazardous environments, the push button switch 36 may be configured so that it too is explosion proof, and does not create a spark when activated by a user.

During an active test of the emergency shutdown system 10, the emergency shutdown controller 44 may supply 24 volts dc, over two electrical wires 22, to power the solenoid valve 16. The solenoid valve 16 is thereby maintained in a stand-by position to provide fluid flow between the pneumatic lines 19 and 28.

When it is desired to manually perform a partial stroke test on the emergency shutdown valve 12, a user may activate the push button device 36 to generate a binary signal, which is detected at the pair of contacts 34, wherein the DVC 14 controls the pneumatic output on the pneumatic line 28, which is coupled to the valve actuator 17, to ramp the valve 12 from the normal 100 percent open (or closed) position (i.e. the normal state) to a partially closed (or partially opened) test position and then back again to the normal state.

Emergency shutdown test systems utilizing external switches that are operably connected to digital valve controllers are much less expensive, more convenient and quicker. Tests can be conducted "on the spot" and the motion of the valve stem can be witnessed. Data may be collected during the emergency shutdown test and retrieved with a portable communications device, such as an AMS ValveLink Software product, through a communication unit 62 in the DVC 14.

Figure 3:
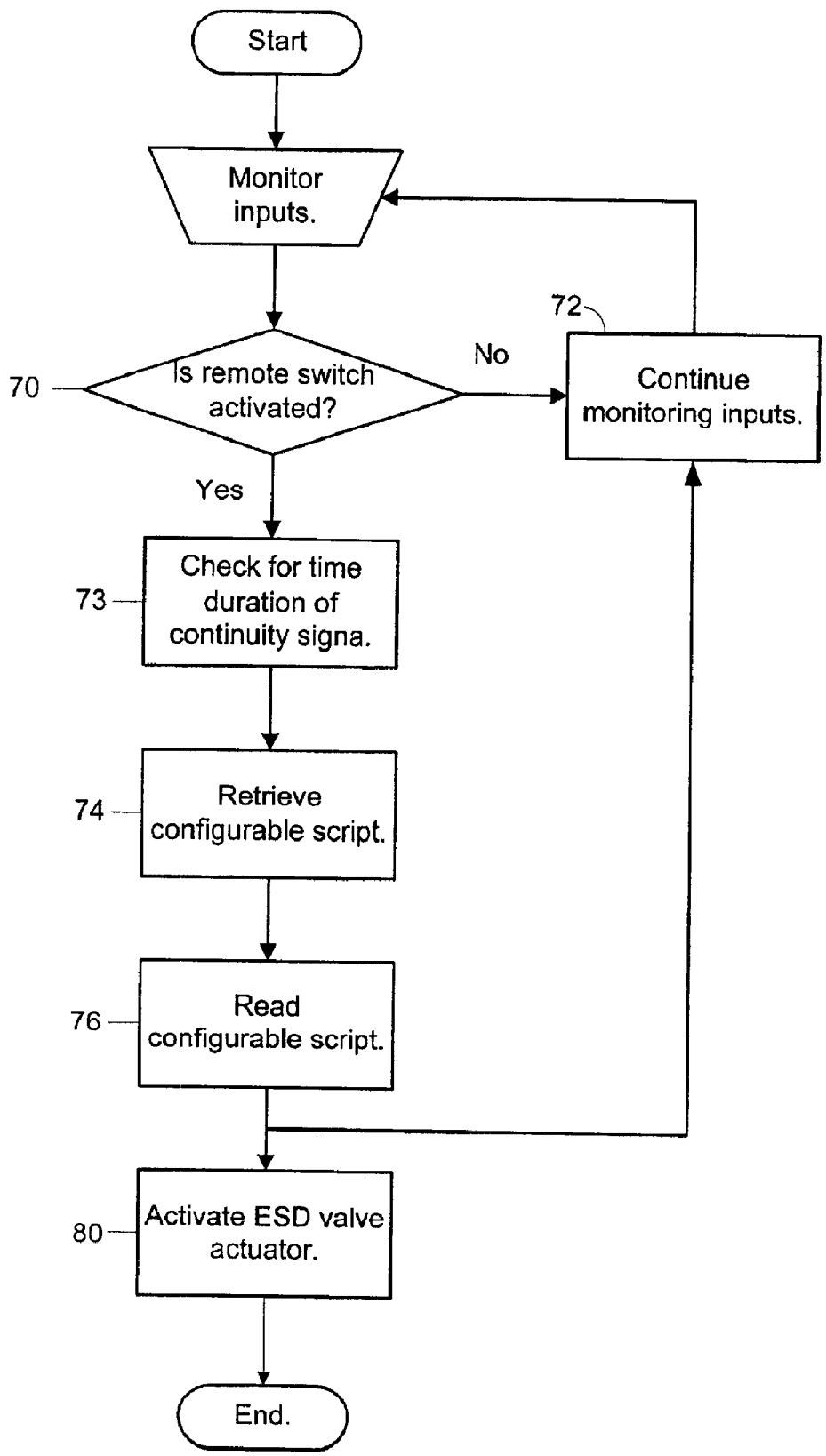
FIG. 3 is a flowchart representation of some of the steps used in activation of an emergency shutdown test.

FIG. 3 illustrates some of the steps that may be used to activate an emergency shutdown test. To initiate an emergency shutdown test, the processor 50 may monitor the pair of auxiliary contacts 34 and determine when the push button 36 is activated, as shown at a block 70. The processor 50 may continue monitoring the pair of auxiliary contacts, as shown at a block 72, during the performance of an emergency shutdown test. As shown at a block 73, the processor 50 may check for a binary signal from the switch 36 having a predetermined time duration. If the time duration of the binary signal is less than a first threshold or greater than a second threshold, the processor 50 may not initiate an emergency shutdown test. Illustrated at a block 74, the DVC's processor 50 may retrieve a configurable script or routine, for access by the processor 50. The processor 50 may read and execute the script, as shown at a block 76. It will be appreciated by those skilled in the art that the scripts may be identified as an emergency shutdown partial stroke script by using a data byte encoded in a script record. During the execution of an emergency shutdown test, the processor 50 may continue to monitor the switch input for an abort signal, as shown at the block 72. Execution of the script by the DVC's processor 50, illustrated at a block 80, may include activating the emergency shutdown valve actuator 17.

A script for an emergency shutdown test may be configured so that an active setpoint (whether from the loop current or a HART signal) continues to be active, and the DVC's processor 50 generates a ramp signal that it is summed with the active setpoint, to produce a resulting target travel. This technique allows the loop current to override the script-generated setpoint in case of an actual emergency shutdown activation. An abort command (i.e., a special message via HART or a second binary signal generated by the push button 36) received at any time during the test may abort the test and immediately withdraw any setpoint bias generated by the script.

As previously mentioned, a user may initiate an emergency shutdown test by activating the external push button 36. Activating the external push button 36 results in establishing electrical continuity between the auxiliary contacts 34. Closing the auxiliary contacts 34 for more than a first predetermined time, but less than a second predetermined time, may activate the emergency shutdown test. For example, closing the auxiliary contacts 34 for more than three seconds, but less than five seconds, could activate the emergency shutdown test. The processor 50 may check at the contacts 34 for a binary signal having a predetermined length of time before initiating the emergency shutdown test. For example, a routine stored in the memory 52 could cause the emergency shutdown test to be performed when the binary signal is received at the input for a time duration greater than a first threshold and less than a second threshold. In other words, it is the processor 50 that is checking for a binary signal that is present at the contacts 34 for a predetermined length of time. During an emergency shutdown test, the test can be manually aborted by activating the switch 36 (closing the contacts 34) for a predetermined amount of time, one second for example, during an ESD test.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A control device test system comprising:
   a valve controller having:
      a processor;
      a memory coupled to the processor;
      an auxiliary input coupled to the processor and adapted to receive a binary signal; and
      a routine stored in the memory end adapted to be executed on the processor to cause a control device test to be performed in response to the receipt of the binary signal at the auxiliary input; and
   an electrical switch, including a push button, coupled to the auxiliary input so as to directly connect the electrical switch to the processor, wherein the electrical switch, responsive to the push button being actuated, generates the binary signal to initiate the control device test of the valve controller, wherein the control device test includes a partial stroke test of a control device.

2. The control device test system of claim 1, wherein the electrical switch is located remote from the valve controller.

3. The control device test system of claim 2, wherein the electrical switch is mounted on the control device.

4. The control device test system of claim 1, wherein the electrical switch comprises a push button switch actuated by movement of the push button.

5. The control device test system of claim 1, further comprising a housing enclosing the valve controller.

6. The control device test system of claim 5, wherein the housing is an explosion proof terminal cover.

7. The control device test system of claim 5, wherein the electrical switch is located external of the housing.

8. The control device test system of claim 3, wherein the control device comprises an emergency shutdown device.

9. A control device test system comprising:
   a valve controller having:
      a processor;
      a memory coupled to the processor;
      an auxiliary input coupled to the processor and adapted to receive a binary signal; and
      a routine stored in the memory and adapted to be executed on the processor to cause a control device test to be performed in response to the receipt of the binary signal at the auxiliary input; and
   an electrical switch, including a push button, coupled to the auxiliary input so as to directly connect the electrical switch to the processor, wherein the electrical switch, responsive to the push button being actuated, generates the binary signal to initiate the control device test of the valve controller;
   wherein the electrical switch is located remote from the valve controller;
   wherein the electrical switch is mounted on a control device;
   wherein the control device comprises an emergency shutdown device which is an emergency shutdown valve, and wherein the control device test includes a partial stroke test of the emergency shutdown valve.

10. The control device test system of claim 1, wherein the auxiliary input comprises a pair of auxiliary contacts.

11. The control device test system of claim 10, wherein a voltage is present at a first auxiliary contact and the electrical switch electrically connects the first auxiliary contact to a second auxiliary contact.

12. The control device test system of claim 1, wherein the auxiliary input comprises an auxiliary contact.

13. The control device test system of claim 1, wherein a voltage source is electrically connected to the auxiliary input via the electrical switch.

14. The control device test system of claim 1, wherein the routine causes the control device test to be performed when the binary signal is received at the auxiliary input for a predetermined length of time.

15. The control device test system of claim 1, wherein the routine causes the control device test to be performed when the binary signal is received at the auxiliary input for a time duration greater than a first threshold and less than a second threshold.

16. The control device test system of claim 1, wherein the routine is further adapted to ignore binary signals having a time duration greater than a predetermined threshold.

17. The control device test system of claim 1, wherein the routine is further adapted to cause the control device test to abort when a second binary signal, having a predetermined time duration, is received at the auxiliary input during an emergency shutdown test.

18. An emergency shutdown valve test system comprising:
   an emergency shutdown valve controller having:
      a processor;
      a memory coupled to the processor;
      an auxiliary contact coupled to the processor and adapted to receive a binary signal, wherein the binary signal has a predetermined time threshold; and
      a routine stored in the memory and adapted to be executed on the processor to cause an emergency shutdown valve test to be performed in response to the receipt of the binary signal at the auxiliary contact;
   a housing enclosing the emergency shutdown valve controller; and
   an electrical switch, including a push button, located external of the housing, and coupled to the auxiliary contact so as to directly connect the electrical switch to the processor, wherein the electrical switch, responsive to the push button being actuated, generates the binary signal to initiate the emergency shutdown valve test of the emergency shutdown valve controller, wherein the emergency valve test includes a partial stroke test of the emergency shutdown valve controller.

19. The emergency shutdown valve test system of claim 18, wherein the electrical switch is mounted proximate an emergency shutdown valve.

20. An emergency shutdown valve test system of claim 18, wherein the electrical switch comprises a push button switch actuated by movement of the push button.

21. The emergency shutdown valve test system of claim 18, wherein the housing is an explosion proof terminal cover.

22. The emergency shutdown valve test system of claim 18, wherein the emergency shutdown valve test is adapted to cause an emergency shutdown valve to move to a predetermined position, and back to an initial position.

23. An emergency shutdown valve test system comprising:
   an emergency shutdown valve controller having:
      a processor;
      a memory coupled to the processor;
      an auxiliary contact coupled to the processor and adapted to receive a binary signal, wherein the binary signal has a predetermined time threshold; and
      a routine stored in the memory and adapted to be executed on the processor to cause an emergency shutdown valve test to be performed in response to the receipt of the binary signal at the auxiliary contact;
   a housing enclosing the emergency shutdown valve controller; and
   an electrical switch located external of the housing, and coupled to the auxiliary contact so as to be operably connected to the processor, wherein the electrical switch generates the binary signal to initiate the emergency shutdown valve test;
   wherein the emergency shutdown valve test includes a partial stroke test for an emergency shutdown valve.

24. The emergency shutdown valve test system of claim 18, wherein a voltage source is electrically connected to the auxiliary contact via the electrical switch.

25. The emergency shutdown valve test system of claim 18, wherein the predetermined time threshold is greater than a first threshold and less than a second threshold.

26. The emergency shutdown valve test system of claim 18, wherein the routine is further adapted to ignore binary signals having a time duration greater than a predetermined threshold.

27. The emergency shutdown valve test system of claim 18, wherein the routine is further adapted to cause the emergency shutdown test to abort when a second binary signal, having a second predetermined time duration, is received at the auxiliary input.

28. The emergency shutdown valve test system of claim 18, wherein the routine is further adapted to cause a second input to be monitored, during the control device test, for a valve stuck alarm condition that would cause the control device test to be aborted.

* * * * *